3,087,789
METHOD OF MAKING A PARTICULATE, SOLID SILICON MONOXIDE PRODUCT

Arthur E. Van Antwerp, Cuyahoga Falls, Ohio, assignor to The B. F. Goodrich Company, New York, N. Y., a corporation of New York
No Drawing. Filed Sept. 27, 1955, Ser. No. 537,054
15 Claims. (Cl. 23—182)

This invention relates to a novel, economical method for producing solid, particulate "monox."

"Monox" or solid, particulate, disproportionated silicon monoxide, $(SiO_2)_x \cdot (Si)_y$ where $x$ and $y$ are integers, can be produced by the reaction of carbon and sand at high temperature in a reducing atmosphere, such as by reaction in an arc furnace, and allowing the gases containing SiO to condense in a partial or an essentially complete vacuum or vacuum chamber or in an inert atmosphere or gas. If the inert condensing gas is purified so that it is essentially free of oxidizing gases, that is, it contains only a few parts of oxygen gas per million parts of inert gas, and is allowed to mix without causing appreciable or substantial turbulence, the resulting, condensed solid disproportionated silicon monoxide will exhibit a high proportion of fibrous particles and may even be entirely fibrous. It, however, has been found that, if the vacuum or inert condensing gas contains any appreciable amount of an oxidizing gas like oxygen, the silicon monoxide will substantially be converted to silicon dioxide of spherical shape or the amount and length of the particles of solid disproportionated silicon monoxide will be drastically reduced. This silicon monoxide will in general have a surface area of from about 60 to 200 square meters per gram. The ratio of the diameter or width to length of the fibrous particles will be from about 1:10 to 1:50.

However, processes utilizing a highly purified inert gas or of purifying an impure inert gas prior to use are not economical due to the high costs involved, and accordingly, it is a primary object of this invention to provide a more economical method for producing solid, particulate disproportionated silicon monoxide.

These and other objects and advantages of the present invention will become more apparent to those skilled in the art from the following detailed description and examples.

According to the present invention, it has been discovered that inert gases containing oxygen can be utilized in the production of solid particulate, disproportionated silicon monoxide provided that a minor amount of a hydrogen furnishing gas is also present with the silicon monoxide gas at about the time it condenses in the inert gas. If the hydrogen furnishing gas and the inert gas are mixed relatively slowly with the silicon monoxide gas as it emerges from the reaction chamber, the disproportionated silicon monoxide produced will be especially tendrilous or will be substantially or essentially fibrous in which the fibers have a high ratio of length to width, the balance of the monoxide being composed of spherical particles or particles exhibiting a head connected to a short tail. Products prepared according to the teaching of the present invention will find utility as fillers in plastics, rubber and so forth, for example in rubber shoe soles, molded polyvinyl chloride articles, etc. Products having a high proportion of fibrous disproportionated silicon monoxide will find especial utility as a reinforcing pigment for rubber to be used in V-belts, tire treads, and the like. These products can also be used to make ceramics, refractories, insulating compositions and so forth. They can also be surface coated with amines, polyhydric alcohols, siloxane resins and so forth to change the surface character of the pigment if desired.

It is not precisely known what occurs when the hydrogen-furnishing gas is mixed with the silicon monoxide gas and the inert condensing gas, but it is believed that the hydrogen-furnishing gas acts as a scavenger and takes up or reacts with the residual oxidizing gases in the inert gas. The furnace gases (SiO and CO) may also contain oxygen from air leaks in the apparatus used or adsorbed in the solid materials used and hydrogen serves to remove these oxygen gases. The formation of amorphous spherical silicon dioxide is thereby essentially prevented. In fact, as a result of the method of the present invention, it is possible to obtain theoretical amounts of $SiO_2$ and Si which form solid disproportionated silicon monoxide. By analysis products of this invention have been shown to contain about 31.8% Si, the balance being $SiO_2$.

The hydrogen furnishing gas can be any gaseous material which will furnish hydrogen to the mixture of silicon monoxide gas and inert condensing gas and which will remove oxidizing gases from the system or prevent their interference with the subsequent condensation of gaseous SiO to solid, particulate $(SiO_2)_x \cdot (Si)_y$. Hydrogen has been found eminently suitable for the purposes of the present invention since it is abundant. Other hydrogen furnishing gases can also be employed such as methane, ethane, propane, butane as well as still other alkane compounds which will crack or decompose in the presence of the hot silicon monoxide gas to furnish hydrogen in an active form suitable for removing residual oxidizing gases. Mixtures of the various hydrogen furnishing gases can be used.

The hydrogen furnishing gas can be used in any amount in the system, but it is preferable to use it in only minor amounts to reduce the cost. Moreover, excessive amounts are not only wasteful due to the fact that the amount of oxidizing gases present in the inert gas and furnace gases are small but increase the hazards of operation. In general, from about ½ to 5 parts by volume of hydrogen furnishing gas to from about 25 to 50 parts by volume of the inert condensing gas such as a commercial grade of nitrogen gas will be found satisfactory for most purposes. The hydrogen furnishing gas can be first mixed with the inert condensing gas which is then introduced into the silicon monoxide gas stream, can be introduced into the silicon monoxide gas as it leaves the reaction chamber, or can be added to the silicon monoxide gas and inert condensing gas mixture before the silicon monoxide gas has cooled sufficiently to condense to the solid state. It is preferred to introduce a mixture of the hydrogen furnishing and inert gases to obtain a uniform distribution of the gas molecules prior to mixing with the SiO gas and to reduce possibility of any prior condensation.

The inert condensing gas used in contacting and condensing the silicon monoxide gas emanating from the furnace may be carbon monoxide, nitrogen, argon, helium, neon and the like. Mixtures of these inert gases may also be used. It will be appreciated that where a reduction process employing carbon is used, CO will also be evolved with the SiO gas. However, additional CO is necessary to provide for the proper dilution and condensation of the SiO in the system for batch type operation. In a continuous operation additional inert condensing gas is initially needed for dilution and quenching but after the operation has been continued for awhile sufficient quantities of inert condensing gas will be available for recirculation back to the condensing chamber. During the process of recirculation back to the furnace the inert gas will have cooled sufficiently to quench fresh SiO gas to the solid state. If the temperature of the inert gas is too high, it can be reduced by being passed through suitable heat exchangers.

In order to make a highly fibrous solid disproportioned silicon monoxide product, the inert condensing gas should be introduced with the hydrogen furnishing gas into the silicon monoxide gas stream at a low velocity to mix with the silicon monoxide gas under conditions substantially free of turbulence. High velocities are to be avoided since they create turbulence in the cooling gases to prevent the formation of fibrous products. While obviously some minor turbulence will occur when the silicon monoxide gas stream contacts the incoming inert condensing gas and hydrogen furnishing gas stream, it should be kept at a minimum. Likewise, it is apparent that some turbulence will occur in the layers of the gas stream adjacent the walls of the apparatus or where there are protuberances. Accordingly, the silicon monoxide gas and the condensing gas mixture should flow at a sufficiently slow rate and the apparatus used should contain a minimum number of protuberances so that the flow is substantially nonturbulent. Preferably, the inflowing inert condensing gas and hydrogen furnishing gas mixture should form a column or cone about the silicon monoxide gas as it issues from the furnace to provide gas flow essentially in the same direction or lamellar flow which is essentially free of turbulence. The volume ratio of silicon monoxide gas produced to inflowing inert condensing gas and hydrogen furnishing gas mixture can vary from about 1:3 to 1:15 to provide a large volume in which the SiO gas can disperse and condense and preferably should be about 1:8. For a typical furnace operation which will produce about 10–15 pounds per hour of the fibrous "monox," it has been found that forty c.f.m. of commercial nitrogen containing 0.03 part by volume of hydrogen results in a product of the desired surface area and fibrous structure. If the rate of flow of the inert condensing gas and the hydrogen furnishing gas are increased substantially to effect a very turbulent mixing of the gases or a blowing of the silicon monoxide gas to rapidly dilute and quench it, little or no time will then be permitted for the silicon monoxide gas particles to aggregate or polymerize and produce fibers. Thus, products having a larger amount of spherical silicon monoxide can be made if desired.

The silica used in the present process may be sand, quartz, or mineral silicates which do not contain impurities which would volatilize during the reaction or form products which would adversely affect the properties of the fibrous disproportionated silicon monoxide. The carbon may be anthracite, graphite, carbon black, coal, coal coke or petroleum coke. It is preferred that the carbon essentially be free of harmful volatiles and other matter which would provide deleterious amounts of impurities in the final product. Silicon or silicon carbide may be used in place of carbon. However, it is preferred to use carbon, in order to obtain the most economical yields of silicon monoxide. While mol ratios of 1:1 silica to carbon are generally used in the furnace, they may be varied somewhat with obtainment of satisfactory results. However, wide variations in mol ratios are not desired as such may tend to reduce the amount of solid disproportionated silicon monoxide obtained and may tend to produce SiC.

In the method of the present invention a charge of essentially equal moles of silica and carbon is subjected to an arc between electrodes connected to a suitable source of electric power in an arc type furnace. The electrodes are insulated from the furnace walls, desirably cooled and may be attached to means to feed them continuously into the furnace chamber as they are consumed in accordance with practices well known in the art. The reaction which takes place in the furnace is represented as follows:

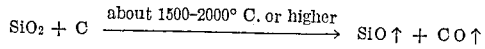

$$SiO_2 + C \xrightarrow{\text{about } 1500-2000°\text{ C. or higher}} SiO\uparrow + CO\uparrow$$

The furnace contains a port through which the silicon monoxide and carbon monoxide gases resulting from the reaction pass to a condensing or gas mixing chamber containing a plurality of gas tubes or a circular ringlike port disposed circumferentially around the inside of the chamber to permit introduction of the inert condensing gas and the hydrogen furnishing gas from sources such as gas cylinders. The inert condensing gas and the hydrogen furnishing gas form a cylindrical or conelike stream about the silicon monoxide and carbon monoxide gases issuing from the furnace and mix with them with a minimum of turbulence. The silicon monoxide gas then disproportionates and condenses, or vice versa, to the solid state, and the mixture of condensed silicon monoxide and inert condensing gas, hydrogen furnishing gas and carbon monoxide gas is delivered to a collecting chamber where the solid product is separated from the gases. The gases may be discharged to the atmosphere, led to suitable gas collecting apparatus for storage or recirculated to the condensing chamber. In place of an arc furnace, a resistance furnace or other high temperature furnace may be used. It is preferred to introduce the inert condensing gas and the hydrogen furnishing gas into the SiO and CO gases outside of the furnace area and more preferably outside of the area of the arc to avoid turbulence and interference with the arc and furnace atmosphere.

In the operation of the method described herein it is possible to continuously feed raw material to the furnace and withdraw solid disproportionated silicon monoxide from the collecting chamber while the inert gas or gases are continuously circulated throughout the system. Once the ratio of inert condensing gas to silicon monoxide gas has been established in a continuous process using recirculating gases, additional inert condensing gas from outside the system is not usually required and excess inert and other gases introduced into the system or produced by the reaction in the furnace can be vented or bled off as desired to avoid high pressures and to remove some of the exhausted hydrogen furnishing gas. Thus, the carbon monoxide produced in the reaction can be used to replace gradually essentially all of the added inert condensing gas by careful bleeding or venting of the excess inert gases from the system. The hydrogen furnishing gas should also be added to react with oxygen of the air from any leaks in the apparatus, since it is virtually impossible to completely seal the furnace and its attendant equipment to prevent entry of air, and to react with any oxygen or oxygen-containing compounds, particularly water, absorbed on or contained in the sand and coke or carbon charge and which would be introduced into the system. Some additional inert gas may also be necessary, of course, from time to time to compensate for possible leakage of inert condensing gas from the apparatus. Moreover, by proper adjustment of the valves of the gas-conveying systems and control of the furnace feed rate, it is possible to maintain the issuance of the SiO gas into the condensing chamber at a fixed rate as well as to maintain the issuance of the inert condensing gas and hydrogen furnishing gas into the same chamber at a fixed rate to obtain continuously a solid, disproportionated silicon monoxide of a generally fixed particle size range with the only fresh material added to the system being the coke and sand charge and the hydrogen furnishing gas. The electrodes may also be continuously supplied to the furnace so that the process need not be stopped to replenish electrodes. Accordingly, shutdown of operations need only occur when repairing the furnace lining and so forth.

While the fiber-like particles obtained by the present method have about the same length, structure and surface area of the prior art "monox," they exhibit a more uniform width and length, show few spherical and horn-like particles mixed therewith, and are more tendrilous than when condensing silicon monoxide gas with an inert gas containing appreciable amounts of available oxygen under turbulent or nonturbulent conditions or in a vacuum. Moreover, by virtue of the use of the method and apparatus disclosed herein it is possible to continuously produce solid, particulate, substantially fibrous disproportionated silicon monoxide at atmospheric pressures avoiding the need for repeated shutdown and removal of product, recharging, and evacuation of the apparatus. Furthermore, extensive sealing of the apparatus to maintain extremely low pressures or a vacuum is not required as the hydrogen furnishing gas tends to keep any oxygen from reacting with the SiO gas and contaminating the product. Extra reinforcement of the apparatus used to withstand high pressures is not required.

The following examples will serve to illustrate the invention with more particularity to those skilled in the art:

*Example I*

An equal molar mixture of sand and pulverized anthracite coal were charged to an arc furnace which was closed except for an opening in its top to permit the gaseous reaction products to escape to a condensing chamber containing several ports for entry of the inert condensing gas and hydrogen furnishing gas and symmetrically positioned about the opening in the furnace top. The condensing chamber was connected in turn to a bag collector. The system was flushed with nitrogen and kept at atmospheric pressure. An arc was struck to initiate reaction between the coal and sand, and, as the gaseous silicon monoxide including CO dispersed therein evolved at a rate of about 3.2 cu. ft. per min., it was mixed with a mixture of commercial oil pump nitrogen gas containing about 0.5% oxygen at a rate of 38 cubic feet per minute and hydrogen gas at a rate of 1.3 cubic feet per minute without causing appreciable turbulence. After the run was completed, the product obtained was removed from the collector bag and examined. It had a surface area of about 105 m.²/g., and was substantially in the form of fibers. On the other hand, when the same procedure was followed except that the hydrogen furnishing gas was omitted, the product obtained had a slightly lower surface area, and the fibrous content had been reduced as a considerable proportion of spherical particles were mixed with the fibers. These results disclose that the oxygen present in commercially available inert condensing gases tends to prevent formation of fibrous particles but that the use of a hydrogen furnishing gas can serve to overcome such difficulties. While the surface area of these particles may be similar, superior reinforcing properties in rubber are obtained when highly fibrous products are used.

*Example II*

The method of this example was the same as Example I, above, except that the nitrogen gas was used at a rate of 42 cu. ft. per min. The resulting product was substantially entirely fibrous and had a surface area of about 122 m.²/g.

In summary, the present invention teaches that a condensed solid, substantially fibrous disproportionated silicon monoxide can readily be prepared by contacting and condensing silicon-monoxide gas in the presence of a commercial grade inert condensing gas containing oxygen and a hydrogen furnishing gas. The condensation of the silicon monoxide gas can be conducted under either turbulent or essentially nonturbulent conditions to provide solid, particulate, disproportionated silicon monoxide of which the particles may be spherical and/or fibrous. By the method disclosed herein a continuous system can be established to recirculate the inert gas produced in the reaction back to the condensing chamber. A standardized disproportionated silicon monoxide mixture can be obtained by operating continuously. Once the system has been operating for a short time it is only necessary to add some hydrogen furnishing gas, to feed the charge of sand and coke, replenish electrodes, and remove product. The present invention can eliminate batchwise operations with its attendant difficulties of cleaning out the furnace, recharging, evacuation and separate collection and avoids the necessity for purifying the inert condensing gas or of using expensive purified inert condensing gases.

I claim:

1. In the method of making a particulate, solid, product comprising silicon monoxide having the general formula $(SiO_2)_x \cdot (Si)_y$ where $x$ and $y$ are integers by reacting a silicon containing material selected from the group consisting of silica, sand, quartz and mineral silicates at elevated temperatures to produce silicon monoxide gas and then mixing a condensing gas, inert to said silicon monoxide gas and containing residual amounts of oxidizing gases, with said silicon monoxide gas to condense said silicon monoxide gas to form said solid product, the improvement comprising condensing said silicon monoxide gas to the solid state with said condensing gas in the presence of a hydrogen furnishing gas selected from the group consisting of hydrogen and a decomposable alkane compound and mixtures thereof to remove oxidizing gases from the system.

2. In the method of making a particulate, solid, product comprising silicon monoxide having the general formula $(SiO_2)_x \cdot (Si)_y$ where $x$ and $y$ are integers by reacting a silicon containing material selected from the group consisting of silica, sand, quartz and mineral silicates at elevated temperatures to produce a stream of silicon monoxide gas and then mixing a stream of a condensing gas, inert to said silicon monoxide gas and containing residual amounts of oxidizing gases, with said silicon monoxide gas stream and condensing said silicon monoxide gas to form said solid product, the improvement comprising mixing the stream of silicon monoxide gas with the stream of said condensing gas to condense said silicon monoxide gas to the solid state in the presence of a hydrogen furnishing gas selected from the group consisting of hydrogen and a decomposable alkane compound and mixtures thereof in a minor amount sufficient to remove oxidizing gases from the system, said condensing gas stream and said hydrogen furnishing gas stream being mixed with said silicon monoxide gas stream at low velocities under conditions substantially free of turbulence to provide a substantially fibrous product.

3. In the method of making a particulate, solid, product comprising silicon monoxide having the general formula $(SiO_2)_x \cdot (Si)_y$ where $x$ and $y$ are integers by reacting a silicon containing material selected from the group consisting of silica, sand, quartz and mineral silicates at elevated temperatures to produce a stream of silicon monoxide gas and then mixing a stream of a condensing gas, inert to said silicon monoxide gas and containing residual amounts of oxidizing gases, with said silicon monoxide gas stream to condense the silicon monoxide gas to form said solid product, the improvement comprising contacting the silicon monoxide gas prior to condensing it to the solid state with a gaseous stream comprising a hydrogen furnishing gas selected from the group consisting of hydrogen and a decomposable alkane compound and mixtures thereof to remove oxidizing gases from the system.

4. In the method of making a particulate, solid, product comprising silicon monoxide having the general formula $(SiO_2)_x \cdot (Si)_y$ where $x$ and $y$ are integers by reacting a silicon containing material selected from the group consisting of silica, sand, quartz and mineral silicates at elevated temperatures to produce a stream of silicon monoxide gas and then mixing a stream of a condensing gas, inert to said silicon monoxide gas and containing residual amounts of oxidizing gases, with said silicon monoxide gas stream and condensing said silicon monoxide gas to form said solid product, the improvement comprising contacting the silicon monoxide gas prior to condensing it to the solid state with a stream of a hydrogen furnishing gas selected from the group consisting of hydrogen and a decomposable alkane compound and mixtures thereof in a minor amount sufficient to remove oxidizing gases from the system, said condensing gas stream and said hydrogen furnishing gas stream being mixed with said silicon monoxide gas stream at low velocities under conditions substantially free of turbulence to provide a substantially fibrous product.

5. In the method of making a particulate, solid, product comprising silicon monoxide having the formula $(SiO_2)_x \cdot (Si)_y$ where $x$ and $y$ are integers by reducing a silicon containing material selected from the group consisting of silica, sand, quartz and mineral silicates at elevated temperatures to produce a stream of silicon monoxide gas and then mixing a stream of a condensing gas, inert to said silicon monoxide gas and containing residual amounts of oxidizing gases, with said silicon monoxide gas to condense said silicon monoxide gas to form said solid product, the improvement comprising adding a stream of a hydrogen furnishing gas selected from the group consisting of hydrogen and a decomposable alkane compound and mixtures thereof in a minor amount sufficient to remove oxidizing gases from the system to said silicon monoxide gas stream prior to adding said condensing gas stream to said silicon monoxide gas stream and prior to condensing said gaseous silicon monoxide to the solid state, said condensing gas stream and said hydrogen furnishing gas stream being mixed with said silicon monoxide gas stream at low velocities under conditions substantially free of turbulence to provide a substantially fibrous product.

6. In the method of making a particulate, solid, product comprising silicon monoxide having the formula $(SiO_2)_x \cdot (Si)_y$ where $x$ and $y$ are integers by reducing a silicon containing material selected from the group consisting of silica, sand, quartz and mineral silicates at elevated temperatures to produce a stream of silicon monoxide gas and then mixing a stream of a condensing gas, inert to said silicon monoxide gas and containing residual amounts of oxidizing gases, with said silicon monoxide gas to condense said silicon monoxide gas to form said solid product, the improvement comprising adding a stream of a hydrogen furnishing gas selected from the group consisting of hydrogen and a decomposable alkane compound and mixtures thereof in a minor amount sufficient to remove oxidizing gases from the system to said silicon monoxide gas stream after adding said condensing gas stream to said silicon monoxide gas stream and prior to condensing said gaseous silicon monoxide to the solid state, said condensing gas stream and said hydrogen furnishing gas stream being mixed with said silicon monoxide gas stream at low velocities under conditions substantially free of turbulence to provide a substantially fibrous product.

7. In the method of making a particulate, solid, product comprising silicon monoxide having the formula $(SiO_2)_x \cdot (Si)_y$ where $x$ and $y$ are integers by reducing a silicon containing material selected from the group consisting of silica, sand, quartz and mineral silicates at elevated temperatures to produce a stream of silicon monoxide gas and then mixing a stream of a condensing gas, inert to said silicon monoxide gas and containing residual amounts of oxidizing gases, with said silicon monoxide gas to condense said silicon monoxide gas to form said solid product, the improvement comprising adding a stream of a hydrogen furnishing gas selected from the group consisting of hydrogen and a decomposable alkane compound and mixtures thereof in a minor amount sufficient to remove oxidizing gases from the system to said condensing gas stream prior to adding the resulting mixed gas stream to said silicon monoxide gas stream, said resulting mixed gas stream and said silicon monoxide gas stream being mixed together at low velocities under conditions substantially free of turbulence to provide a substantially fibrous product.

8. In the method of making a particulate, solid, product comprising silicon monoxide having the formula $(SiO_2)_x \cdot (Si)_y$ where $x$ and $y$ are integers by reducing a silicon containing material selected from the group consisting of silica, sand, quartz and mineral silicates with a carbonaceous reducing agent at sufficiently elevated temperatures of at least about 1500 to 2000° C. or higher in a first zone to produce a stream of silicon monoxide gas, delivering said silicon monoxide gas to a second zone and then enveloping said silicon monoxide gas with a stream of a condensing gas, inert to said silicon monoxide gas and containing residual amounts of oxidizing gases, to condense said silicon monoxide gas to form said solid product, the improvement comprising adding a stream of a hydrogen furnishing gas selected from the group consisting of hydrogen and a decomposable alkane compound and mixtures thereof to said condensing gas stream and in a minor amount sufficient to take up residual oxidizing gases prior to adding the resulting mixed gas stream to said silicon monoxide gas stream, said resulting mixed gas stream being introduced into said silicon monoxide gas stream under conditions of lamellar flow essentially free of turbulence to provide a substantially fibrous product.

9. In the method according to claim 8 where said hydrogen furnishing gas and said condensing gas are used in an amount of from about ½ to 5 parts by volume of said hydrogen furnishing gas to from about 25 to 50 parts by volume of said condensing gas.

10. In the method according to claim 9 where the volume ratio of said silicon monoxide gas to said mixture of condensing gas and hydrogen furnishing gas is from about 1:3 to 1:15.

11. In the method according to claim 10 where said hydrogen furnishing gas comprises hydrogen.

12. In the method according to claim 10 where said alkane compound comprises methane.

13. In the method according to claim 10 where said alkane compound comprises ethane.

14. In the method according to claim 10 where said alkane compound comprises propane.

15. In the method according to claim 10 where said alkane compound comprises butane.

References Cited in the file of this patent

UNITED STATES PATENTS

| | | |
|---|---|---|
| 875,286 | Potter | Dec. 31, 1907 |
| 993,913 | Tone | May 30, 1911 |
| 1,104,384 | Potter | July 21, 1914 |
| 2,582,885 | Rosenblatt | Jan. 15, 1952 |
| 2,823,979 | Sears | Feb. 18, 1958 |
| 2,823,980 | Sears | Feb. 18, 1958 |